United States Patent [19]

Swaine, Jr. et al.

[11] 4,105,754

[45] Aug. 8, 1978

[54] PRODUCTION OF HIGH PURITY CALCIUM THIOSULFATE

[75] Inventors: James W. Swaine, Jr., Manlius; William W. Low, Syracuse; Samuel L. Bean, Jamesville, all of N.Y.

[73] Assignee: Allied Chemical Corporation, Morris Township, Morris County, N.J.

[21] Appl. No.: 845,013

[22] Filed: Oct. 25, 1977

[51] Int. Cl.$^2$ ............................................. C01B 17/64
[52] U.S. Cl. ..................................... 423/514; 423/357
[58] Field of Search ................................ 423/514, 357

[56] References Cited

U.S. PATENT DOCUMENTS

| | | | |
|---|---|---|---|
| 2,041,397 | 5/1936 | Butterworth et al. | 423/514 X |
| 2,198,642 | 4/1940 | Vokennel et al. | 423/514 |

FOREIGN PATENT DOCUMENTS

| | | | |
|---|---|---|---|
| 407,875 | 12/1924 | Fed. Rep. of Germany | 423/514 |
| 866,646 | 2/1953 | Fed. Rep. of Germany | 423/514 |
| 48-6039 | 2/1973 | Japan | 423/514 |

*Primary Examiner*—Jack Cooper
*Attorney, Agent, or Firm*—Anthony J. Stewart; Thomas D. Hoffman

[57] ABSTRACT

A process for the production of high purity calcium thiosulfate by a metathesis reaction of ammonium thiosulfate and calcium hydroxide or calcium oxide is disclosed. Aqueous solutions of high purity calcium thiosulfate, in concentrations up to about 30% by weight, are prepared by removing substantially all of the co-product ammonia under conditions which minimize the decomposition of the thiosulfate ion. Heating the reaction mixture to a temperature of about the boiling point at atmospheric pressure is used to prepare aqueous solution of about 10% by weight calcium thiosulfate, and lower reaction temperatures are employed to prepare more concentrated aqueous solutions of calcium thiosulfate up to about 30% by weight, which is the saturation point.

15 Claims, 1 Drawing Figure

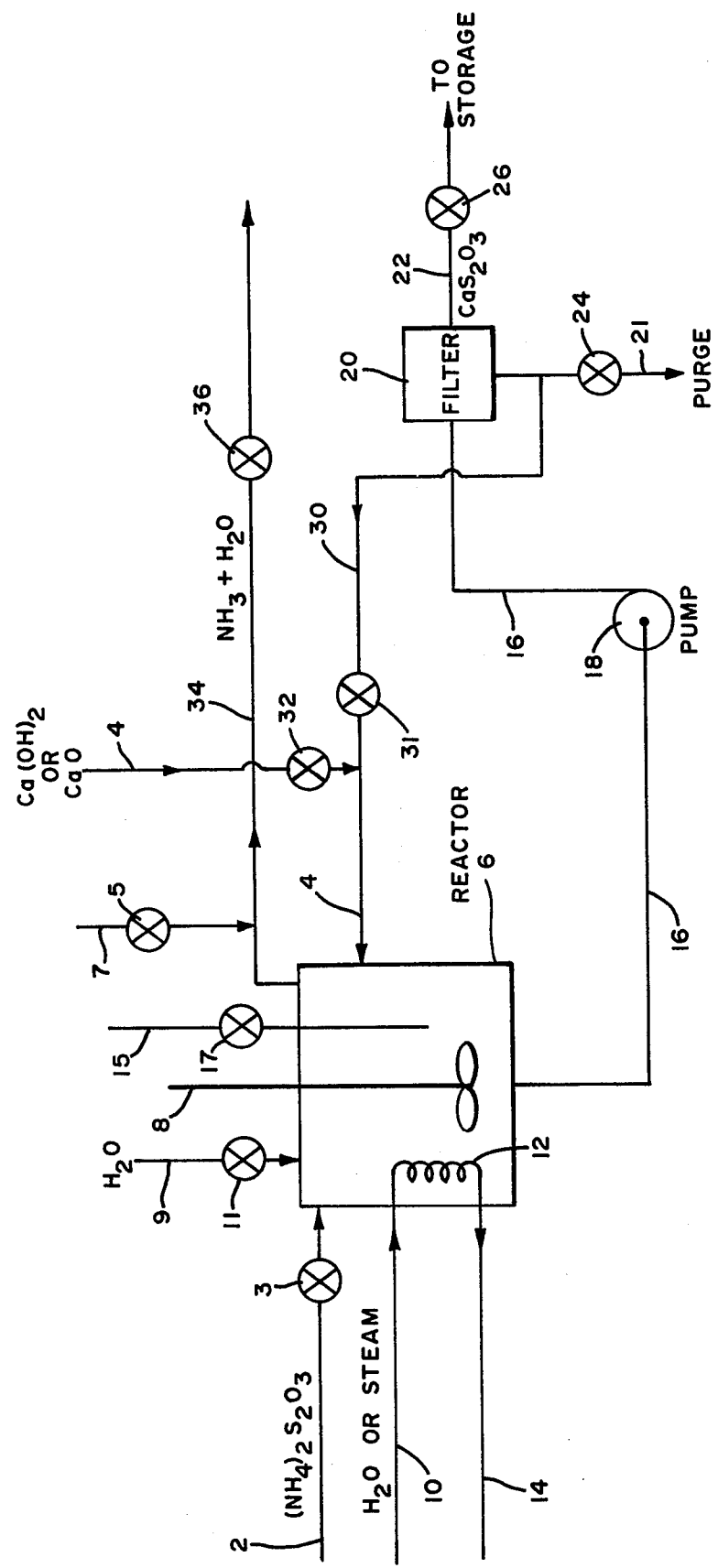

PRODUCTION OF HIGH PURITY CALCIUM THIOSULFATE

BACKGROUND OF THE INVENTION

1. Field of the Invention

The present invention relates to a method for the production of high purity calcium thiosulfate by a metathesis reaction of ammonium thiosulfate and calcium hydroxide or calcium oxide.

2. Description of the Prior Art

Although the prior art contains many references to the production of calcium thiosulfate, at present, there are no known commercial processes for the manufacture of high purity calcium thiosulfate.

Japanese Pat. No. 6,039, issued Feb. 22, 1973, discloses a process for the manufacture of calcium or magnesium thiosulfate by reacting calcium or magnesium sulfite with sulfur in alkaline solution. High yields are obtained only in the preparation of magnesium thiosulfate. This Japanese patent also discloses a metathesis reaction between calcium hydroxide and magnesium thiosulfate to produce calcium thiosulfate and insoluble magnesium hydroxide. However, the preparation of calcium thiosulfate solutions according to this Japanese patent requires a difficult filtration of a slurry containing magnesium hydroxide.

In Spanish Pat. 245,171, issued Nov. 15, 1958, a process is disclosed for the preparation of calcium thiosulfate by reacting a mixture of calcium chloride hexahydrate and calcium hydroxide with a concentrated solution of sodium thiosulfate at 30° C. Not only are 0.77 tons of co-product sodium chloride produced for every ton of calcium thiosulfate produced but residual sodium chloride is an objectionable contaminant, e.g., when calcium thiosulfate is used as a non-corrosive hardening accelerator for concrete.

High purity calcium thiosulfate hexahydrate ($CaS_2O_3 \cdot 6H_2O$) is produced by a metathesis reaction between a concentrated solution of calcium chloride hexahydrate and sodium thiosulfate pentahydrate, described in Monatsh, 80, 220-31 (1949). A stream of nitrogen is bubbled into the reaction mixture to exclude air and $CO_2$ and the pH of the metathesis reaction solution is adjusted to about 8 to 9 by addition thereto of calcium oxide. However, the solid calcium thiosulfate so produced requires a purification step at temperatures of 0° C or lower.

It is accordingly an object of the present invention to provide a method for the production of high purity calcium thiosulfate by a metathesis reaction wherein difficult processing steps and objectionable impurities are avoided and conversion rates are high.

It is another objection of the present invention to provide a process for the production of aqueous solutions of high purity calcium thiosulfate up to the saturation concentration under conditions which minimize the decomposition of the thiosulfate ion.

It is still further an object of the present invention to provide a method for the production of calcium thiosulfate wherein integration of said method with a process for the manufacture of the ammonium thiosulfate feedstock is feasible.

Other objects and advantages of the present invention will become apparent from the description which follows.

SUMMARY OF THE INVENTION

According to the present invention, a process for the production of high purity calcium thiosulfate is provided wherein an aqueous solution of ammonium thiosulfate is contacted with greater than 1.0 and less than about 1.10 of a stoichiometric amount of calcium hydroxide or calcium oxide. The temperature of the mixture is maintained between 25° C and the boiling point for a period of time of at least about 3 hours. Aqueous solutions of calcium thiosulfate, up to the saturation point, are produced, containing no objectionable impurity, in yields exceeding 90% of the theoretical amount by continuously removing the ammonia formed under the conditions of the present invention. A small quantity, usually less than 1% by weight, of ammonium thiosulfate, and minor amounts of decomposition products are the only impurities found in the calcium thiosulfate so produced.

In the process of this invention essentially complete, rapid removal of the gaseous co-product ammonia serves to minimize the decomposition of the thiosulfate ion and thereby to maximize the yield of the calcium thiosulfate product. The optimum commercial concentration range of the aqueous product solution is from about 10% to 30% by weight. In accordance with the present invention, substantially all, preferably greater than 90%, most preferably greater than 95% by weight of the theoretical amount of the co-product ammonia formed is removed from the metathesis reaction mixture as the reaction proceeds. While boiling the metathesis reaction mixture at atmospheric pressure is sufficient to prepare aqueous solutions up to about 10% by weight calcium thiosulfate, the more concentrated solutions, up to 30% by weight which is approximately the saturation point, are prepared by removing the ammonia at temperatures below the boiling point of the solution. Reduced pressures of air stripping are employed to remove the ammonia at reduced temperatures. It has been found that at the atmospheric boiling point of the metathesis reaction mixture, the decomposition of the thiosulfate ion increases rapidly as the concentration of the thiosulfate in solution increases above about 10% by weight. Within these guidelines, solutions of up to about 30% by weight calcium thiosulfate may be prepared by simply adjusting the temperature and/or pressure to obtain the desired product solution.

The terms "vacuum" and "absolute pressure" appear often in the description of this invention. For clarity, a vacuum of 13 inches of mercury is equivalent to a pressure of 13 inches of mercury below atmospheric (1 atmosphere equals about 30 inches of mercury). Thus, a vacuum of 13 inches of mercury is the same as an absolute pressure of 17 inches of mercury.

Substantially complete removal of the ammonia from the metathesis mixture may be accomplished in accordance with the present invention by maintaining the pressure of the mixture at less than atmospheric and the temperature below the boiling point. For example, using a vacuum of 9 to 21 inches of mercury (an absolute pressure of 21 to 9 inches of mercury), preferably about 13 inches of mercury (17 inches of mercury, absolute pressure), while maintaining the reaction at a temperature between 50° and 75° C, for a period of time between about 3.0 and 5.0 hours, one can remove essentially all the ammonia and prepare aqueous solution of up to 30% by weight calcium thiosulfate and keep the decomposition of the thiosulfate ion in the range of 1 to 6% by weight. Overall yields of calcium thiosulfate exceed 90% of the theoretical. As the temperature and reaction time period are increased above the limits of this invention, the decomposition of the thiosulfate ion increases very rapidly, especially when the concentration of thiosulfate ion in solution exceeds about 10% by weight, thereby producing an unacceptable product. Specifically, in the attempted preparation of a 30% by weight calcium thiosulfate solution at a temperature of 85° C and an absolute pressure of 17 inches of mercury, the decomposition of thiosulfate exceeds 35% after 5 hours. However, it has been found that aqueous solutions of about 30% by weight calcium thiosulfate are successfully prepared in accordance with this invention when the co-product ammonia formed is removed at a temperature between 50° and 75° C, preferably between 70° and 75° C and at an absolute pressure between 9 and 21 inches of mercury, preferably 17 inches of mercury, absolute, for a time period of from about 3.0 to 5.0 hours, preferably 3.5 hours. While solutions of high purity calcium thiosulfate up to the saturation point can be prepared when the metathesis reaction mixture is maintained at lower temperatures under lower absolute pressure for a longer time, there are obvious attendant economic disadvantages.

Aqueous solutions of about 20% by weight calcium thiosulfate can be prepared in yields exceeding 90% of the theoretical with only about 2% thiosulfate decomposition when the ammonia is removed at a temperature between 70° and 85° C, preferably between 80° and 85° C and an absolute pressure between 9 and 21 inches of mercury, preferably 17 inches of mercury, for a period of time between about 3.5 and 5.0 hours, preferably 5.0 hours.

Less concentrated aqueous solutions of about 10% by weight calcium thiosulfate are prepared by removing the ammonia at a temperature between 50° and 90° C, preferably at 85° C and absolute pressures between 9 and 21 inches of mercury, preferably 17 inches of mercury, absolute, for a time period of 3.5 to 5.0 hours, preferably 5.0 hours. Higher vacuums (lower absolute pressures) and lower temperatures could be employed to remove the ammonia but the economics do not justify their use in a commercial process.

In accordance with an additional embodiment of this invention, the ammonia is removed at about atmospheric pressure and a temperature from about 25° to 85° C by air stripping, i.e., sparging air through the aqueous reaction mixture, for a period of time of at least about 3 hours to prepare aqueous solutions of up to 30% by weight calcium thiosulfate. When the temperature of the reaction mixture is maintained between 55° and 65° C, preferably no higher than 62° C, the ammonia is essentially completely removed by air stripping. Yields of calcium thiosulfate are greater than 90% of theoretical and the decomposition of the thiosulfate is kept below about 6% by weight. At longer reaction times and at temperatures above 65° C, the thiosulfate decomposition tends to increase quite significantly.

It has been discovered that when air stripping is employed, the quantity of air required to effectively remove the ammonia is greater than about 0.05 ft³/minute/gallon of thiosulfate solution. Of course larger amounts of air can be applied to the reaction mixture at lower temperatures for longer periods of time provided that the economics are acceptable. Dropping below this preferred value of about 0.05 ft³/min/gal, the amount of ammonia removed is lowered and the percent conversion of ammonium thiosulfate to calcium thiosulfate is correspondingly decreased. In the operation of this invention, when air stripping is used to remove the co-product ammonia, an air sparger of any conventional design may be immersed into a stirred slurry of calcium hydroxide or calcium oxide and aqueous ammonium thiosulfate. Air flow and heating are initiated simultaneously and continued until the ammonia removal and the metathesis reaction are essentially complete. It is found in the preparation of a about 30% calcium thiosulfate solution, when air stripping is employed to remove the ammonia at a temperature between 55° and 60° C, there exists a preferred level of 1.02 and 1.07 times the stoichiometric amount of calcium hydroxide or calcium oxide within which the decomposition of thiosulfate is less than 4% by weight. When more than about 1.10 times the stoichiometric amount of calcium hydroxide or calcium oxide is used, the decomposition of thiosulfate ion increases very rapidly and the aqueous calcium thiosulfate becomes intensely yellowish.

In accordance with the present invention a novel metathesis reaction of ammonium thiosulfate and calcium hydroxide or calcium oxide occurs according to the following equation:

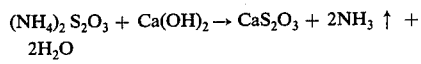

This invention can easily be integrated with a process for the manufacture of ammonium formed thiosulfate if the co-product ammonia is recycled.

BRIEF DESCRIPTION OF THE DRAWINGS

The present invention is more clearly illustrated in the attached drawing. FIGURE is a schematic view of a process which may be used to produce calcium thiosulfate by the metathesis reaction of the present invention.

DETAILED DESCRIPTION OF THE INVENTION AND OF THE PREFERRED EMBODIMENTS

Referring to FIGURE, an aqueous solution of ammonium thiosulfate from storage or an ammonium thiosulfate production unit (not shown) is introduced through line 2 and valve 3 into reactor 6 which is equipped with agitator 8 and heating means 12 having inlet line 10 and outlet line 14. Reactor 6 may be any conventional or suitable type of reactor capable of maintaining pressures in the range of from about 1.0 to about 0.3 atmospheres. A slurry of calcium oxide or calcium hydroxide is charged to reactor 6 via line 4 through valve 32. While stoichiometric amounts of calcium hydroxide or calcium oxide in excess of the preferred amount, for example 1.10 to 1.12 times the stoichiometric amount may be employed, they produce yellowish solutions of calcium thiosulfate product. Unacceptable discoloration of the product when the amount of calcium oxide or calcium hydroxide employed is outside the range of greater than 1.0 to less than about 1.10, preferably 1.02 to 1.07, is believed to be due to the sulfur formed by the decomposition of the thiosulfate ion in solution.

Water is added to reactor 6 through line 9 and valve 11 to maintain the appropriate concentration for the metathesis reaction and product calcium thiosulfate. The metathesis reaction mixture is removed from reactor 6 via line 16 through pump 18 to filter 20 wherein unreacted calcium hydroxide is separated and recycled to reactor 6 via lines 30 and 4 through valve 31. Alternately this excess reactant can be purged from filter 20 via line 21 and valve 24. The aqueous solutions of product calcium thiosulfate are removed from filter 20 via line 22 through valve 26 to a storage unit (not shown).

Removal of at least about 95% of the co-product ammonia is preferable to force the metathesis reaction to completion. Ammonia gas or aqueous solutions of ammonia are removed from reactor 6 via line 34 through valve 36. The co-product ammonia can be disposed of in various ways although it is advantageous if it is recycled to an ammonium thiosulfate plant (not shown). In this way the present invention can be integrated with a process for the preparation of reactant ammonium thiosulfate as described above.

Heating the stirred reaction mixture to a temperature below the boiling point at atmospheric pressure will slowly effect removal of the co-product ammonia. As the temperature is raised to the boiling point of the mixture, the ammonia removal is accelerated but simultaneously the decomposition of the thiosulfate ion tends to increase.

While atmospheric boiling is effective for ammonia removal to prepare aqueous solutions up to about 10% by weight calcium thiosulfate, vacuum or air stripping is required to facilitate ammonia removal and minimize the decomposition of the thiosulfate ion in the preparation of aqueous solutions containing from about 20 to about 30% by weight calcium thiosulfate.

Aqueous solutions of up to about 10% by weight calcium thiosulfate can be prepared containing less than about 0.5%, usually less than about 0.1% by weight ammonium thiosulfate by using atmospheric boiling for a period of time from about 3.0 to 5.0 hours, preferably about 4.75 hours, to remove substantially all the co-product ammonia. The percent conversion of ammonium thiosulfate is usually greater than 99% while greater than 98% of the theoretical amount of calcium thiosulfate is recovered and the decomposition of thiosulfate ion is less than about 1.5% by weight. When atmospheric boiling is employed to prepared more concentrated aqueous solutions of calcium thiosulfate, containing more than about 10% by weight calcium thiosulfate, the decomposition of the thiosulfate ion occurs much faster and thus, should be avoided.

To prepare these more concentrated aqueous solutions of calcium thiosulfate in excess of about 10% by weight, the stirred metathesis reaction mixture in reactor 6 is maintained at a vacuum of between 9 and 21 inches of mercury, preferably at a vacuum of 13 inches of mercury (17 inches of mercury, absolute) by a vacuum pump (not shown) connected to line 34 through line 7 and valve 5. Aqueous solutions containing 20% by weight calcium thiosulfate can be readily prepared in accordance with this invention by maintaining the vacuum between about 9 and 21 inches of mercury, preferably at about 13 inches of mercury and heating the stirred metathesis mixture at a temperature between about 80° and about 85° C for a period of time from about 3.0 to 6.0 hours, preferably about 5.0 hours. The product calcium thiosulfate is recovered in greater than 90% of the theoretical amount while the decomposition of thiosulfate is only about 2% by weight. In order to make a 30% by weight calcium thiosulfate solution the temperature of the metathesis reaction mixture is kept below about 80° C, preferably between about 70° and 75° C, and the absolute pressure maintained between 9 and 21 inches of mercury, preferably at about 17 inches of mercury for a period of time from about 3.0 to 5.0 hours, preferably about 3.5 hours to keep the decomposition of the thiosulfate below about 5% by weight.

The vacuum need not be limited to about 9 to about 21 inches of mercury. Increased vacuum (lower absolute pressures) and lower temperatures could be employed to remove the ammonia without deleteriously affecting the present invention, but the economics do not justify their use in a commercial process. At vacuums less than 13 inches of mercury, the metathesis reaction would have to be maintained at lower temperatures for longer periods of time to effect similar results.

When air stripping is employed to remove the co-product ammonia, an air flow of at least about 0.050 cubic feet/minute/gallon of thiosulfate solution is applied through a sparger into the metathesis mixture in reactor 6 through line 15 and valve 17 to remove substantially all of the co-product ammonia as it is formed. When air stripping is employed in accordance with the preferred embodiment of this invention the overall recovery of the calcium thiosulfate product exceeds 90% of theoretical, based on ammonium thiosulfate conversions which are greater than about 90%, usually greater than about 93% of theoretical. The only apparent upper limit on air flow is reaction integrity and economics. Significantly lower air flow rates effect a considerable decrease in the conversions of ammonium thiosulfate. In accordance with this invention air stripping can be employed to prepare aqueous solutions of any concentration of up to 30% by weight calcium thiosulfate. For example, aqueous solutions of about 20% by weight calcium thiosulfate while a temperature between 75° and 85° C, preferably of less than about 80° C is maintained for a time period of at least 3 hours, preferably about 5.0 hours. The percent conversion of starting materials and recovery of product calcium thiosulfate usually exceeds 98% while the percent of decomposition of thiosulfate ion is usually about 1.1% by weight. In the preparation of aqueous solutions of calcium thiosulfate up to 30% by weight air stripping is employed to effect the successful removal of the co-product ammonia while the stirred metathesis reaction mixture is maintained for a period of time of from about 3.0 to about 6.0 hours, preferably about 5.0 hours at a temperature below about 68° C, preferably below 62° C to minimize the decomposition of the thiosulfate ion.

The following examples are presented to illustrate the present invention and set forth the best mode currently contemplated for its practice. Percent is by weight unless otherwise noted. Results are given in Table 1.

EXAMPLE 1

460.5 grams of a 10.76% $(NH_4)_2S_2O_3$ solution are charged to a stirred reactor fitted with a thermometer and heated to boiling. 25.9 grams of $Ca(OH)_2$ (97.8% assay), 1.022 times the stoichiometric amount, are added over a 30 minute period. The slurry is heated at the boiling point for 4.25 hours after the completion of the lime addition. The volume of the reaction mixture is maintained by addition of boiling water. At the end of the heating period the reaction mixture is filtered and the filtrate analyzed for $S_2O_3^{-2}$ and $Ca^{+2}$ to determine the degree of conversion to $CaS_2O_3$. The filtered cake is washed to remove mother liquor and dried at 110° C. Dry cake is analyzed for $SO_3^{-2}$ to determine the degree of thiosulfate decomposition. The overall yield of $CaS_2O_3$ is 98.4% of the theoretical amount based on a 99.3% conversion of ammonium thiosulfate to $CaS_2O_3$. The filtrate is found to contain 10.6% by weight $CaS_2O_3$ and 0.1% by weight $(NH_4)_2S_2O_3$.

EXAMPLE 2

This experiment is an attempt to prepare a 20% $CaS_2O_3$ solution. Atmospheric boiling is used to remove the ammonia. The procedure of Example 1 is followed except that 460.5 grams of a 21.5% $(NH_4)_2S_2O_3$ solution are mixed with 51.8 grams of $Ca(OH)_2$ (97.8% assay). The overall yield of $CaS_2O_3$ is only 48.5% of theoretical and the decomposition of thiosulfate is about 44.9%.

EXAMPLE 3

460.5 grams of a 31.84% $(NH_4)_2S_2O_3$ solution are contacted with 76.7 grams of $Ca(OH)_2$ under the conditions of Example 1. This is an attempt to prepare a 30% solution of $CaS_2O_3$ by using atmospheric boiling to remove the co-product ammonia. Considerable decomposition of thiosulfate is found.

EXAMPLE 4

460.5 grams of a 10.74% $(NH_4)_2S_2O_3$ solution are charged to a stirred reactor equipped with an air bleeding device to control vacuum and an outlet connected to a vacuum source. 26.2 grams of $Ca(OH)_2$ are added while the reaction mixture is heated to 85° C. Analysis of the reaction mixture is performed as described in Example 1.

EXAMPLE 5

460.5 grams of a 21.5% $(NH_4)_2S_2O_3$ solution are contacted with 52.3 grams of $Ca(OH)_2$ under conditions as described in Example 4. The overall yield of $CaS_2O_3$ is 92.8%, based on a 94.8% conversion of $S_2O_3^{-2}$. Only 2.1% of the $S_2O_3^{-2}$ ion is decomposed.

EXAMPLE 6-7

460.5 grams of a 31.5% $(NH_4)_2S_2O_3$ solution are contacted with 76.7 grams of $Ca(OH)_2$ under conditions as described in Example 5 except that the temperature is maintained at 75° C for 3.5 and 5.0 hours in the two separate runs. The percent decomposition of thiosulfate ion was 6.3% after 5 hours at 75° C and a vacuum of 13 inches of mercury. When the reaction period is 3.5 hours, the percent decomposition is smaller and the recovery of $CaS_2O_3$ product larger.

EXAMPLE 8

460.5 grams of a 10.76% $(NH_4)_2S_2O_3$ solution and 26.4 grams of $Ca(OH)_2$ are mixed in a stirred reactor equipped with a thermometer and air sparger immersed in the reaction slurry. Air flow (0.048 ft³/min/gal) and heating are started at the same time and continued for 4 hours after a temperature of 80° C is attained. An additional 0.7g of $Ca(OH)_2$ is added and heating at 80° C is continued for one more hour. Reaction volume is maintained by periodic addition of water heated to 80° C. The reaction mixture is filtered and analyzed as described above. The theoretical yield of $CaS_2O_3$ is 99.1% based on a 100% conversion of ammonium thiosulfate. The percent decomposition of $S_2O_3^{-2}$ ion is only 0.9%.

EXAMPLE 9

460.5 grams of 21.5% $(NH_4)_2S_2O_3$ solution are mixed with 54.2 grams of $Ca(OH)_2$ (1.042 times the stoichiometric) under conditions of Example 8. An additional 1.4 grams of $Ca(OH)_2$ are added to the reactor at the end of the fourth hour at 80° C. Analysis of the reaction mixture is conducted as before. The theoretical yield of $CaS_2O_3$ is 98.4% based on a 99.6% conversion of $S_2O_3^{-2}$ to $CaS_2O_3$. The decomposition of thiosulfate ion is only 1.2% by weight

EXAMPLE 10

460.5 grams of a 31.5% $(NH_4)_2S_2O_3$ solution are contacted with 76.7 grams of $Ca(OH)_2$. Air flow and heating are started at the same time and continued for 5.0 hours at 60° C. Reaction volume is maintained by periodic addition of water preheated to 60° C. The reaction mixture is filtered and analyzed as described above. The overall yield of $CaS_2O_3$ is 94.9% of the theoretical amount based on a 97.1% conversion of thiosulfate ion to $CaS_2O_3$. The decomposition of thiosulfate ion is 2.3% by weight.

Table 1

| | | Preparation of $CaS_2O_3$ by the Metathesis Reaction of $(NH_4)_2S_2O_3$ and $Ca(OH)_2$,* | | | | | |
|---|---|---|---|---|---|---|---|
| Ex- | Composition of Filtrate | | Method of | Temperature | Time | % Conversion of | % Decomposition | % Yield of |
| ample | % $CaS_2O_3$ | %$(NH_4)_2S_2O_3$ | $NH_3$ Removal | ° C | Hours | $(NH_4)_2S_2O_3$ to $CaS_2O_3$ | of $S_2O_3$ ion | $CaS_2O_3$ |
| 1 | 10.6 | 0.1 | Atmospheric Boiling | Boiling Point | 4.75 | 99.3 | 0.9 | 98.4 |
| 2 | 11.0 | 1.4 | " | " | " | 88.0 | 44.9 | 48.5 |
| 3 | — | — | " | " | " | — | 63.0 | — |
| 4 | 10.5 | 0.1 | 13 inches+ vacuum | 85° | 5.0 | 98.9 | 1.3 | 97.6 |
| 5 | 20.2 | 1.1 | " | 85° | 5.0 | 94.8 | 2.1 | 92.8 |
| 6 | 28.0 | 0.9 | " | 75° | 3.5 | 96.9 | 4.1 | 92.9 |
| 7 | 28.3 | 0.7 | " | 75° | 5.0 | 97.4 | 6.3 | 91.3 |
| 8 | 10.8 | 0.0 | Air stripping | 80° | 5.0 | 100 | 0.9 | 99.1 |
| 9 | 20.6 | 0.1 | " | 80° | 5.0 | 99.6 | 1.2 | 98.4 |
| 10 | 28.3 | 0.8 | " | 60° | 5.0 | 97.1 | 2.3 | 94.9 |

*1.02 to 1.07 times the stoichiometric amount of $Ca(OH)_2$ is used
+an absolute pressure of 17 inches of mercury.

We claim:
1. A process for producing high purity calcium thiosulfate which comprises the steps of:
  (a) contacting an aqueous solution of ammonium thiosulfate with greater than 1.0 and less than 1.10 of a stoichiometric amount of calcium oxide or calcium hydroxide to form a reaction mixture;
  (b) maintaining the reaction mixture at a temperature between about 25° C and the boiling point of the reaction mixture for a period of at least about 3 hours;
  (c) continuously removing the formed ammonia from the reaction mixture; and
  (d) recovering the high purity calcium thiosulfate product.
2. The process as described in claim 1 wherein in step (a) at least 1.02 and no more than 1.07 of a stoichiometric amount of calcium hydroxide or calcium oxide is used.

3. The process as described in claim 1 wherein in step (a) the aqueous solution of ammonium thiosulfate is contacted with calcium hydroxide.

4. The process as described in claim 1 wherein in step (b) the reaction mixture is heated to the boiling point at atmospheric pressure for a period of time of at least about 3.0 to about 5.0 hours.

5. The process as described in claim 1 wherein in step (b) the reaction mixture is heated to a temperature between 50° and about 90° C at an absolute pressure between 9 and 21 inches of mercury.

6. The process as described in claim 5 wherein the temperature is about 85° C at an absolute pressure of about 17 inches of mercury.

7. The process as described in claim 5 wherein the temperature is between about 70° and 75° C at an absolute pressure of about 17 inches of mercury for a period of time of about 3.5 hours.

8. The process as described in claim 5 wherein the temperature is between about 80° and about 85° C at an absolute pressure of 17 inches of mercury.

9. The process as described in claim 1 wherein in step (c) the co-product ammonia is used to produce ammonium thiosulfate which is recycled to step (a).

10. A process for producing high purity calcium thiosulfate which comprises the steps of:
 (a) contacting an aqueous solution of ammonium thiosulfate with greater than 1.0 and less than 1.10 of stoichiometric amount of calcium oxide or calcium hydroxide to form a reaction mixture;
 (b) maintaining the reaction mixture at a temperature between about 25° and 85° C for a period of time of at least about 3 hours;
 (c) continuously removing the formed ammonia by sparging the reaction mixture with an air stream supplied at a flow rate of at least about 0.05 ft$^3$/minute/gallon of the reaction mixture; and
 (d) recovering the high purity calcium thiosulfate product.

11. The process as described in claim 10 wherein in step (a) at least 1.02 and no more than 1.07 of a stoichiometric amount of calcium hydroxide or calcium oxide is used, and wherein in step (b) the reaction mixture is heated to a temperature between about 75° and 85° C for a period of about 5 hours.

12. The process as described in claim 10 wherein in step (a) the aqueous solution of ammonium thiosulfate is contacted with calcium hydroxide.

13. The process as described in claim 10 wherein in step (a) at least 1.02 and no more than about 1.07 of a stoichiometric amount of calcium hydroxide or calcium oxide is used, and wherein in step (b) the reaction mixture is heated to a temperature between about 55° and about 60° C.

14. A process as described in claim 10 wherein in step (a) at least 1.02 and no more than about 1.07 of a stoichiometric amount of calcium hydroxide or calcium oxide is used, and wherein in step (b) the reaction mixture is heated to a temperature no higher than about 62° C.

15. The process as described in claim 10 wherein in step (c) the co-product ammonia is used to produce ammonium thiosulfate which is recycled to step (a).

* * * * *